UNITED STATES PATENT OFFICE.

HUBERT DE ROSSI, OF NEW YORK, N. Y.

FRESCO-PAINTERS' SIZING.

SPECIFICATION forming part of Letters Patent No. 308,143, dated November 18, 1884.

Application filed May 19, 1884. (No specimens.)

*To all whom it may concern:*

Be it known that I, HUBERT DE ROSSI, a subject of His Majesty the King of Prussia and Emperor of Germany, residing at New York, in the county of New York and State of New York, have invented a new and useful Improvement in Fresco-Painters' Sizing, of which the following is a full and complete description.

This invention relates to a sizing designed to be used in painting walls and ceilings in ornamental designs, usually called "fresco-painting," and the object is to produce a sizing which shall cause the wall or ceiling to take and hold the color well when applied, and to prevent the applied color from dissolving when a fresh application of color is made to the painted surface; and it consists in the use of the following substances in about the proportions hereinafter specified.

I take of common hard soap, three (3) parts; good glue, eight (8) parts; alum, twelve (12) parts, by weight. These proportions may be varied slightly to suit different purposes or tastes. I dissolve the soap in water by boiling in the proportions of about three (3) ounces of soap to one (1) pint of water. The glue is also dissolved in water by boiling in the proportions of about eight (8) ounces of glue to one (1) quart of water. Also, dissolve the alum in water by boiling in the proportions of about twelve (12) ounces of alum to three (3) pints of water. After dissolving thoroughly, as before specified, I put the solution of soap in the solution of glue, mixing them thoroughly by stirring, then slowly add the solution of alum to the mixture, stirring the whole thoroughly. I then allow this mixture to cool, and when cooled sufficiently I spread it into somewhat thin sheets, or make it into small cakes, or into any convenient form, and let it dry thoroughly, when it will become hard and firm. This dried mixture may then be put up in any suitable form for market. When it is to be used, it is dissolved by adding about one (1) gallon of cold water to one (1) pound of the dried mixture and allowed to heat on the fire until thoroughly dissolved. Then add one (1) pint of cold water, and it is ready for use. The sizing, when thus prepared, is to be used in or applied to the ornamentation of walls or ceilings in the same manner as the ordinary sizing.

Having thus described my invention, what I claim is—

1. The improved sizing hereinbefore described, consisting of the following ingredients in about the proportions named, viz.: hard soap, three (3) parts; glue, eight (8) parts; alum, twelve (12) parts, dissolved in water and mixed together, as and for the purpose specified.

2. As an article of commerce, the hereinbefore-described sizing for use of fresco-painters, consisting of a mixture of hard soap, glue, and alum, in about the proportions stated, dried in cakes or bars, as and for the purpose described.

HUBERT DE ROSSI.

Witnesses:
 THEODORE FELDSTEIN,
 FERDINAND CELLARIUS.